United States Patent [19]

Mishiro

[11] Patent Number: 4,812,697
[45] Date of Patent: Mar. 14, 1989

[54] ULTRASONIC VIBRATOR AND A METHOD OF CONTROLLINGLY DRIVING SAME

[75] Inventor: Shoji Mishiro, Kanagawa, Japan

[73] Assignee: Taga Electric Co., Ltd., Tokyo, Japan

[21] Appl. No.: 34,024

[22] Filed: Apr. 3, 1987

[30] Foreign Application Priority Data

Apr. 9, 1986 [JP] Japan ................... 61-81922
Aug. 13, 1986 [JP] Japan ................. 61-189844

[51] Int. Cl.$^4$ .......................................... H01L 41/08
[52] U.S. Cl. ....................... 310/323; 310/325; 310/333; 310/357; 310/312
[58] Field of Search ............. 310/316, 317, 26, 323, 310/325, 328, 333, 357, 358, 359, 312; 318/116, 118

[56] References Cited

U.S. PATENT DOCUMENTS

| | | | |
|---|---|---|---|
| 4,210,837 | 7/1980 | Vasiliev et al. | 310/323 |
| 4,562,373 | 12/1985 | Tokusima et al. | 310/323 X |
| 4,562,374 | 12/1985 | Sashida | 310/323 |
| 4,697,117 | 9/1987 | Mishiro | 310/323 |
| 4,703,214 | 10/1987 | Mishiro | 310/323 X |
| 4,705,980 | 11/1987 | Mishiro | 310/323 |

FOREIGN PATENT DOCUMENTS

| | | |
|---|---|---|
| 55-125052 | 9/1980 | Japan . |
| 60-257777 | 12/1985 | Japan . |
| 61-28482 | 2/1986 | Japan . |
| 61-30972 | 2/1986 | Japan . |
| 651434 | 3/1979 | U.S.S.R. ............... 310/323 |

*Primary Examiner*—Mark O. Budd
*Attorney, Agent, or Firm*—Oblon, Fisher, Spivak, McClelland & Maier

[57] ABSTRACT

An ultrasonic vibrator comprises torsional electrostrictive transducers for torsional vibration, longitudinal electrostrictive transducers for longitudinal vibration, and two metallic members firmly, coaxially and integrally holding the torsional electrostrictive transducers and the longitudinal electrostrictive transducers therebetween. An altered section is formed in one of the metallic members in such a shape that makes the torsional resonant frequency and the longitudinal resonant frequency coincide with each other. A voltage or an electric current having a controlled amplitude and/or a controlled relative phase is applied to the electrostrictive transducers to generate composite vibrations of various modes.

7 Claims, 8 Drawing Sheets

AMPLITUDE OF TORSIONAL VIBRATION

FIG. 1 (c)

AMPLITUDE OF LONGITUDINAL VIBRATION

TORSIONAL VIBRATION

AXIAL VIBRATION

AMPLITUDE OF
TORSIONAL VIBRATION

FIG. 24(c)

AMPLITUDE OF
LONGITUDINAL VIBRATION

ULTRASONIC VIBRATOR AND A METHOD OF CONTROLLINGLY DRIVING SAME

FIELD OF THE INVENTION AND RELATED ART STATEMENT

The present invention relates to an ultrasonic vibrator capable of generating longitudinal vibrations, torsional vibrations, and composite vibrations of longitudinal vibrations and torsional vibrations and, more specifically, to an ultrasonic vibrator suitably applicable to a machine tool for vibratory machining and a method of controllingly driving such an ultrasonic vibrator.

Generally, Langevin type transducers each comprising an annular electrostrictive element integrally held between metallic members for resonance are used widely as high-power ultrasonic vibrators. Langevin type transducers are put to practical uses as longitudinal vibrators which vibrate in an axial direction and as torsional vibrators which vibrate about an axis, which are single-mode vibrators capable of vibrating only in a single direction, namely, in an axial direction or in a torsional direction.

Japanese Pat. No. 55-125052 discloses an ultrasonic motor employing such a single-mode vibrator. In his ultrasonic motor, a vibrating piece is provided on the output end of a longitudinal vibrator, and a movable member, for example, a rotor, is pressed against the vibrating piece with the normal to the rotor at the point of contact inclined slightly to the axis of the longitudinal vibrator. In this state, the longitudinal vibrator is vibrated; consequently the tip of the vibrating piece makes an elliptic vibration to drive the rotor frictionally.

Such an ultrasonic motor employing a single-mode vibrator, however, has disadvantages that the respective portions of the vibrating piece and the rotor at the point of contact are abraded rapidly, and the motor generates large noise.

Figure 26:
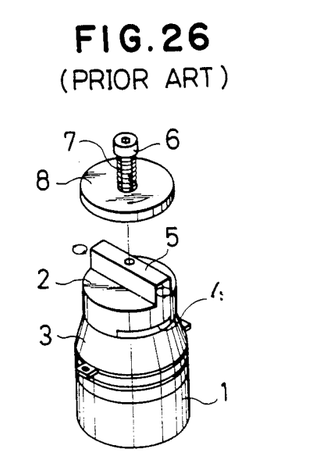
FIG. 26 is an exploded perspective view of a conventional ultrasonic vibrator shown by way of example.

FIG. 26 illustrates another known vibrator differing from the foregoing vibrator combined with a vibrating piece. The vibrator 3 is formed by integrally fastening together a longitudinal transducer 1 and a torsional converter 2. A wide groove 4 is formed in one side of the torsional converter 2, while a rib 5 skewed relative to the groove 4 is formed in the other side of the torsional converter 2. A disk-shaped rotor 8 is pressed resiliently and rotatably to the torsional converter 2 by means of a bolt 6 and a coil spring 7. When the longitudinal transducer 1 is actuated to generate a vibration, the vibration is transmitted to the torsional converter 2, then the tip of the rib 5 of the torsional converter 2 makes an elliptic vibration as indicated by an arrow to drive the rotor 8 for rotation in the direction of the arrow.

Such a longitudinal-to-torsional vibration conversion type is eliminated of the disadvantages of the foregoing vibrating piece type. However, the ellipticity of the elliptic vibration of the output end is uniquely dependent only on the shape of the torsional converter 2, and hence it is impossible to control the ellipticity to an optimum value for frictional driving and to control the direction of the elliptic rotation. Accordingly, the rotor 8 is driven for rotation only in a single direction and, further, it is impossible to regulate the elliptic motion properly so that the abrasion of the contact surfaces is reduced and the rotor is driven efficiently by the maximum torque.

To avoid such inconvenience, the applicant of the present invention for patent invented and applied for patent a composite vibration generating means capable of individually generating an axial vibration and a torsional vibration, which is disclosed in Japanese Pat. No. 61-28482. According to this invention, a vibrator is formed by integrally and firmly combining a torsional vibrator, a radial or longitudinal resonator having the same resonant frequency as the torsional vibrator, capable of generating a vibration in a direction perpendicular to the axis of the torsional transducer and disposed at the node of the torsional vibrator, and a driving element, and the respective amplitudes or the respective relative phases of the torsional vibrator and the radial or longitudinal resonator, or the respective amplitudes and the relative phases are regulated to control the mode of the composite vibration of the output end.

Japanese Pat. No. 61-30972 of the applicant of the present invention discloses an ultrasonic motor employing such a vibrator.

The foregoing prior art, however, has problems which will be described below. The vibrator disclosed in Japanese patent application No. 61-28482 made by the applicant of the present invention, is capable of being driven for individual torsional vibration and axial vibration, and hence the vibrator is able to generate various composite vibrations by controlling the respective amplitudes and relative phases of the torsional transducer and the radial or longitudinal resonator. However, since the radial or longitudinal resonator is large in size as compared with the torsional vibrator, it is difficult to form the vibrator in a compact construction.

OBJECT AND SUMMARY OF THE INVENTION

A first object of the present invention is to provide an ultrasonic vibrator capable of operating in various modes of vibration and a controllingly driving same.

A second object of the present invention is to provide an ultrasonic vibrator of a compact construction and a method of controllingly driving same.

A third object of the present invention is to provide an ultrasonic vibrator capable of being easily controlled for various modes of vibration and a method of controllingly driving same.

A fourth object of the present invention is to provide an ultrasonic vibrator capable of being driven for a vibration of a comparatively high frequency, for example, when employed in an ultrasonic motor and a method of controllingly driving same.

A fifth object of the present invention is to provide an ultrasonic vibrator warranting excellent durability and reliability, for example, when employed in an ultrasonic motor and a method of controllingly driving same.

To achieve the foregoing object of the invention, the present invention provides an ultrasonic vibrator comprising a metallic member having an altered section of a cross section different from that of the body section, for making the torsional resonant frequency and longitudinal resonant frequency of the metallic member coincide with each other, torsional electrostrictive transducers firmly combined with the metallic member, and longitudinal electrostrictive transducers firmly combined with the metallic member.

In driving the torsional electrostrictive transducers and the longitudinal electrostrictive transducers, the respective amplitudes and/or the respective relative phases are controlled.

When the shape of the metallic member firmly and integrally combined with the electrostrictive torsional transducers and the longitudinal electrostrictive transducers is a mere cylinder, the inherent longitudinal resonant frequency of the metallic member is higher than the inherent torsional resonant frequency. Therefore, the cross section of the metallic member is altered partly to make the longitudinal and torsional resonant frequencies coincide with each other. Accordingly, in driving the torsional and longitudinal electrostrictive transducers, the respective amplitudes and/or the respective relative phases are controlled properly for the optional variation of the mode of vibration of the output end between linear vibration modes, circular vibration modes and elliptic vibration modes of optional directions. Since the transducers require no additional structures, the ultrasonic vibrator can be formed in a compact construction. Furthermore, the coincidence of the torsional resonant frequency and the longitudinal resonant frequency facilitates control operation to generate vibrations of various modes.

BRIEF DESCRIPTION OF THE DRAWINGS

FIG. 9(a) to 9(g) to 15(a) to 15(i) are diagrammatic illustration various modes of vibration;

FIGS. 16(a) and 16(b) to 23(a) and 23(b) are longitudinal sectional views and side elevations showing various forms of the altered section;

FIGS. 24(b) and 24(c) are graphs showing the respective amplitudes of the torsional vibration and longitudinal vibration of the ultrasonic vibrator of FIG. 24(a);

DESCRIPTION OF THE PREFERRED EMBODIMENTS

An ultrasonic vibrator, in a first embodiment, according to the present invention will be described hereinafter.

Figure 1:
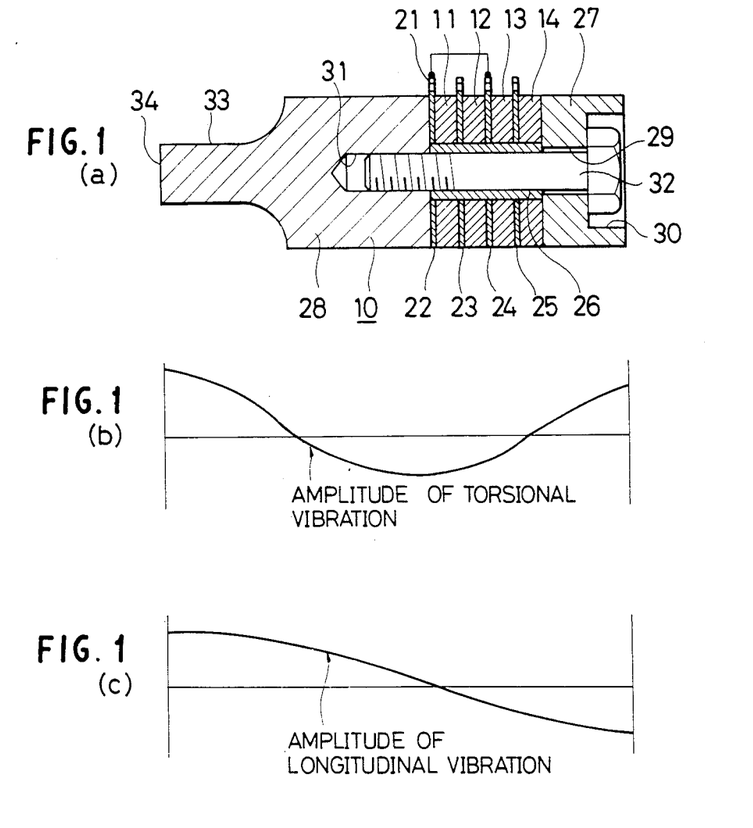
FIG. 1(a) is a longitudinal sectional view of an ultrasonic vibrator, in a first embodiment, according to the present invention.
FIGS. 1(b) and 1(c) are graphs showing the amplitude of the torsional vibration and that of the longitudinal vibration of the ultrasonic vibrator of FIG. 1(a), respectively.

Shown in FIG. 1(a) is an ultrasonic vibrator 10 comprising annular longitudinal electrostrictive transducers 11 and 12, and annular torsional electrostrictive transducers 13 and 14.

Figures 2, 3, 4:
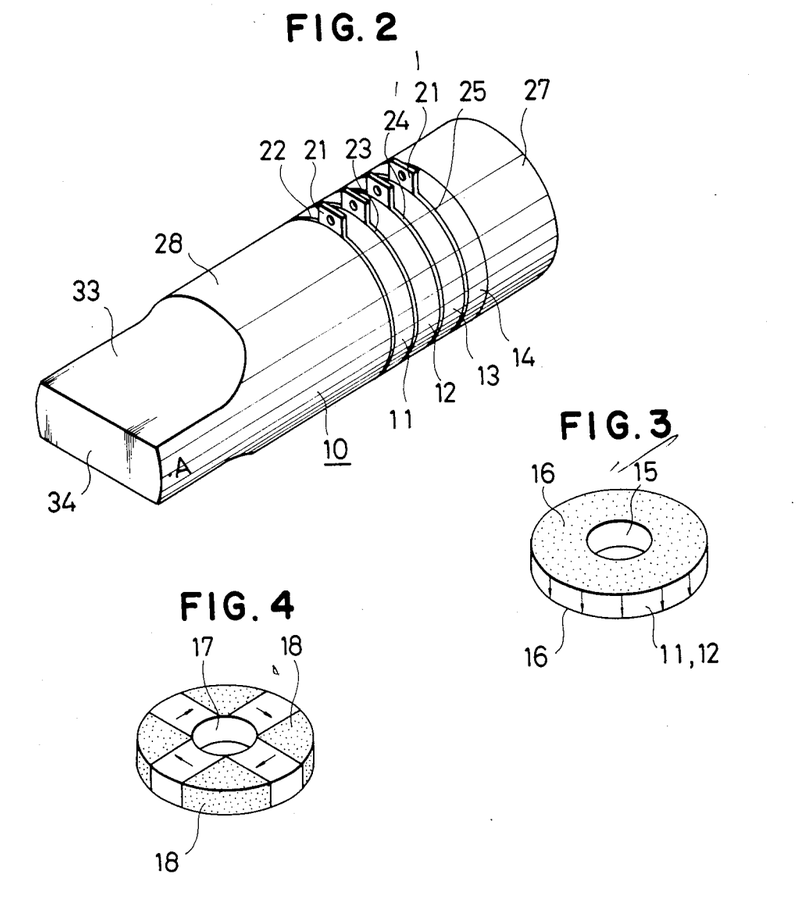
FIG. 2, is a perspective view of the ultrasonic vibrator of FIG. 1(a)
FIG. 3 is a perspective view of a longitudinal electrostrictive transducer.
FIG. 4 is a perspective view of an unfinished torsional electrostrictive transducer.
Figure 5:
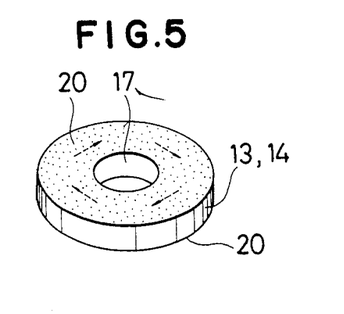
FIG. 5 is a perspective view of a torsional electrostrictive transducer.

Referring to FIG. 3, the longitudinal electrostrictive transducers 11 and 12 each is formed in an annular shape having a central hole 15, and is polarized longitudinally, namely, in the direction of the thickness, as indicated by arrows. A pair of electrodes 16 are attached to the opposite sides of each of the longitudinal electrostrictive transducers 11 and 12. When an alternating electric field is established between the electrodes 16, the longitudinal electrostrictive transducers 11 and 12 are caused to expand and contract alternately to generate a longitudinal vibration, namely, a vibration in the direction of the thickness.

The electrostrictive torsional electrostrictive transducers 13 and 14 each formed in an annular shape having a central hole 17 is manufactured by the following process. First, as shown in FIG. 4, a plurality of polarizing electrodes 18 having a thickness corresponding to that of the torsional transducer are arranged at regular angular intervals, then portions between the adjacent polarizing electrodes 18 are polarized sequentially as indicated by arrows, then the polarizing electrodes 18 are removed, and then electrodes 20 are formed over the opposite sides of the portions. When an alternating electric field is established between the electrodes 20, a rotational vibration as indicated by arrows is generate.

The torsional electrostrictive transducers 13 and 14 may be known means such as means invented by the applicant of the present application and disclosed previously in Japanese Patent Provisional Publication (Kokai) No. 60-257777.

Figure 6:
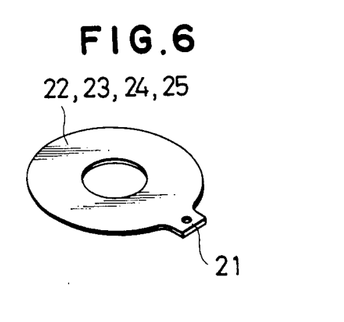
FIG. 6 is a perspective view of an electrode plate.

FIG. 6 shows an electrode plate 22, 23, 24 or 25 having a terminal tab 21 projecting from the body thereof.

Referring to FIG. 1(a), the longitudinal electrostrictive transducers 11 and 12 and the torsional electrostrictive transducers 13 and 14 are mounted axially in that order with the electrode plates 22, 23, 24 and 25 therebetween on an insulating pipe 26, and then the arrangement of the longitudinal electrostrictive transducers 11 and 12, the torsional electrostrictive transducers 13 and 14, and the electrode plates 22, 23, 24 and 25 is clamped firmly between metallic members 27 and 28 with a bolt 32. A through hole 29 and a counterbore 30 are formed in the metallic member 27, while a internally threaded hole 31 is formed in the metallic member 28. The bolt 32 is passed through the through hole 29 and is screwed in the internally threaded hole 31 to clamp the longitudinal electrostrictive transducers 11 and 12, the torsional electrostrictive transducers 13 and 14, and the electrode plates 22, 23, 24 and 25 between the metallic members 27 and 28. One end of the metallic member 28 is formed in an altered section 33 and the tip of the altered section 33 functions as an output end 34.

The electrode plate 22 disposed between the metallic member 28 and the longitudinal electrostrictive transducer 11, and the electrode plate 24 disposed between the longitudinal electrostrictive transducer 12 and the torsional electrostrictive transducer 13 are interconnected to use the electrode plates 22 and 24 as common electrode plates. An AC voltage is applied across the common electrode plates 22 and 24, and the electrode plate 23 disposed between the longitudinal electrostrictive transducers 11 and 12, and then the frequency of the AC voltage is adjusted to the longitudinal resonant frequency. Then, the output end 34 of the ultrasonic vibrator 10 resonates at the maximum amplitude with the AC voltage.

Since the common electrodes 22 and 24, and the metallic member 27 are electrically connected, the output end 34 of the ultrasonic vibrator 10 resonates torsionally at the maximum amplitude, when an AC volt is applied across the common electrodes 22 and 24, and the electrode plate 25 disposed between the torsional electrostrictive transducers 13 and 14 and the frequency of the AC voltage is adjusted to the torsional resonant frequency.

The altered section 33 of the metallic member 28 is one of the features of the present invention. The significant functions of the altered section 33 will be described hereinafter.

When the metallic member 28 is a simple cylindrical member not having a portion such as the altered section 33, the mode of the longitudinal resonant vibration of the ultrasonic vibrator 10 is similar to that of the conventional longitudinal vibrator, and the mode of the torsional resonant vibration of same is similar to that of the conventional torsional vibrator. In such a conventional vibrator, when the longitudinal resonant frequency is, for example, 21.3 kHz in $\lambda/2$-resonance ($\lambda$ is the wavelength), the torsional resonant frequency is 13.2 kHz, which is considerably low. This significant difference between the longitudinal resonant frequency and the torsional resonant frequency is due to a fact that the longitudinal vibration is a longitudinal wave, while the torsional vibration is a transversal wave.

It has been difficult to make the respective resonant frequencies of the longitudinal vibration and the torsional vibration, which are essentially different from each other, to coincide with each other, therefore, it has been difficult to generate a well controlled composite vibration of a longitudinal vibration and a torsional vibration, such as a circular vibration, an elliptic vibration or a diagonal vibration.

Figure 7:
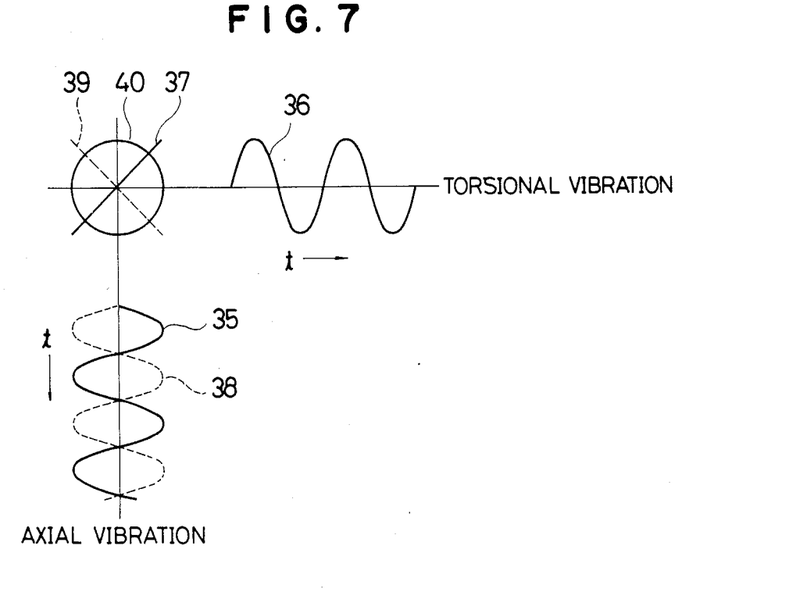
FIG. 7 is a graph showing a mode of composite vibration of a longitudinal vibration and a torsional vibration.

Provided that the longitudinal vibration and the torsional vibration are the same in resonant frequency. Then, since the respective direction of vibration of the axial vibration 35 and the torsional vibration 36 of a point A on the circumference of the output end 34 (FIG. 2) are perpendicular to each other as shown in FIG. 7, the composite vibration is a linear vibration 37 when the axial vibration 35 and the torsional vibration 36 are the same in phase; and the composite vibration is a linear vibration 39 as indicated by a broken line when the axial vibration 35 is inverted to shift the phase by 180° as indicated by a broken curve 38. Thus, the difference in direction between the linear vibration 37 and the linear vibration 39 is an angle of 90°. When the relative phase is 90°, the composite vibration is an elliptic vibration. The direction of rotation of the elliptic vibration is dependent on whether the phase of the axial vibration 35 is advanced or lagged by 90° relative to that of the torsional vibration 36. Furthermore, an elliptic vibration can be generated by varying the relative amplitude, or an inclined elliptic vibration can be generated by varying the relative amplitude and the relative phase in combination. As is well known, various composite vibrations can be produced through the quadrature composition of sinusoidal vibrations.

Figure 8:
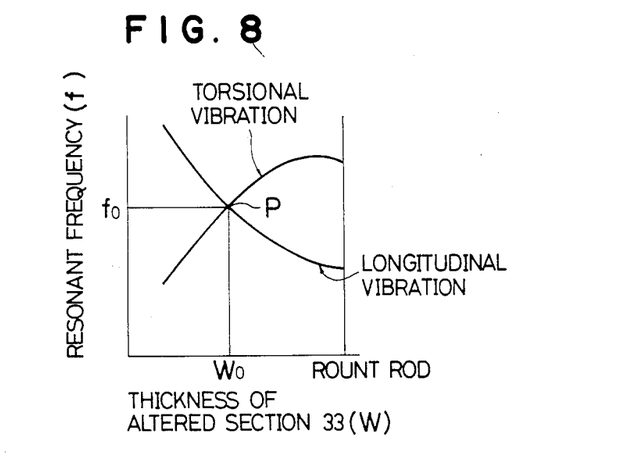
FIG. 8 is a graph showing the variation of the respective resonance frequencies of longitudinal vibration and torsional vibration with the thickness of the altered section of the metallic member.

When the longitudinal resonant frequency of the round rod mentioned above is 21.3 kHz, the torsional resonant frequency in the secondary resonance (1$\lambda$ resonance) is 24.5 kHz. Since the altered section 33 reduces the mass of the end portion to increase the longitudinal resonant frequency, while a bending component acts to reduces the torsional resonant frequency. Accordingly, it is possible to make the longitudinal resonant frequency and the torsional resonant frequency coincide with each other by forming the altered section 33 in an appropriate thickness. The respective modes of variation of the longitudinal and torsional frequencies with the thickness of the altered section 33 are shown in FIG. 8. In FIG. 8, the thickness W of the altered section 33 is measured on the horizontal axis and the longitudinal and torsional resonant frequencies are measured on the vertical axis. A thickness $W_0$ corresponding to a point P where the curves intersect each other makes the longitudinal and torsional resonant frequencies coincides with each other at a resonant frequency $f_0$.

The respective amplitude distributions of the torsional vibration and the longitudinal vibration when the longitudinal and torsional resonant frequencies of the vibrator 10 shown in FIG. 1(a) coincides with each other, are shown in FIGS. 1(b) and 1(c), respectively. It is seen from the graphs that a position where the cross section of the metallic member 28 changes corresponds to the node. Thus, the amplitude of the torsional vibration is amplified.

Provided that the altered section 33 of the vibrator 10 is formed so as to make the respective resonant frequencies of the longitudinal and torsional vibrations coincides with each other, the common electrode plates 22 and 24 and the electrode plates 23 and 25 are connected to a driving power source, and then the frequency of the driving power source is adjusted to the resonant frequency.

Figure 9:
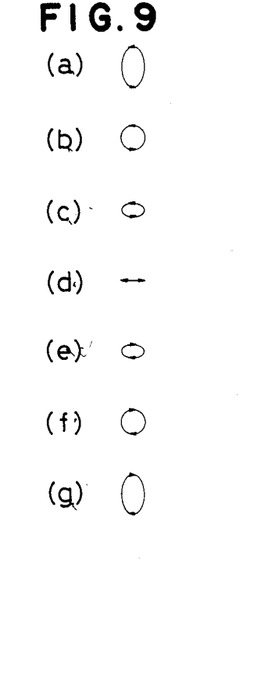

When a driving voltage of a relative phase of 90° is applied only to the electrode plate 23, the point A on the output end 34 vibrates axially as shown in FIG. 9(d). When a driving voltage of a relative phase of 90° is applied to the electrode plate 25 and the amplitude of the driving voltage is increased gradually, the mode of variation of the point A varies from a horizontal elliptic vibration (FIG. 9(c)) through a circular vibration (FIG. 9(b)) to a vertical elliptic vibration (FIG. 9(a)). When a driving voltage of a relative phase of −90° is applied to the electrode plate 25 and the amplitude of the driving voltage is increased gradually, the mode of vibration of the point A varies from a horizontal elliptic vibration (FIG. 9(e)) through a circular vibration (FIG. 9(f)) to a vertical elliptic vibration (FIG. 9(g)), in which the direction of rotation is reverse to those of the vibrations shown in FIGS. 9(c), 9(b) and 9(a).

Figure 10:
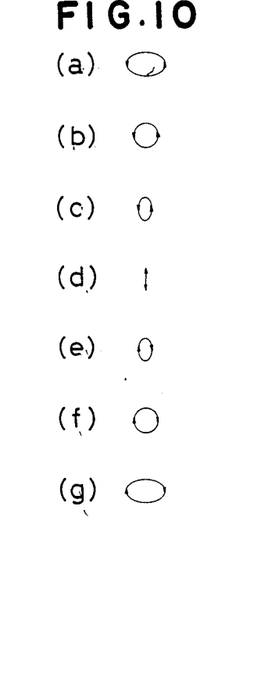

When a driving voltage is applied only to the electrode plate 25, the point A is caused to make a torsional vibration in a direction perpendicular to the axis of the vibrator 10 as shown in FIG. 10(d). As the amplitude of the driving voltage is increased, the mode of vibration of the point A varies sequentially through elliptic vibrations of different ellipticities depending on the amplitude of the driving voltage shown in FIGS. 10(c), 10(b) and 10(a) or through elliptic vibrations of different ellipticities depending on the amplitude of the driving voltage shown in FIGS. 10(e), 10(f) and 10(g), depending on whether the relative phase of the driving voltage is +90° or −90°. The directions of rotation of the elliptic vibrations shown in FIGS. 10(c), 10(b) and 10(a) are opposite to those of the elliptic vibrations shown in FIGS. 10(e), 10(f) and 10(g).

Figure 11:
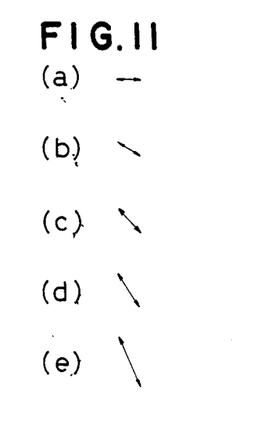
Figure 12:
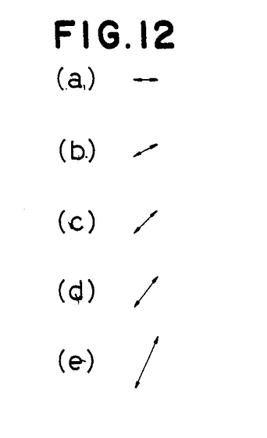

When a fixed driving voltage is applied to the electrode plate 23, a driving voltage of the same phase is applied to the electrode plate 25, and the amplitude of the driving voltage applied to the electrode plate 25 is increased gradually from zero, the amplitude and inclination of the vibration of the point A increases from an axial vibration shown in FIG. 11(a) sequentially through diagonal vibrations shown in FIGS. 11(b) to 11(e). When the relative phase between the driving voltages applied to the electrode plates 23 and 25 is inverted and the amplitude of the driving voltage applied to the electrode plate 25 is increased gradually from zero, the axial vibration of the point A when the amplitude of the voltage applied to the electrode plate 25 is zero varies in amplitude and inclination through vibrations shown in FIGS. 12(a) to 12(e) as the amplitude is increased. The respective inclinations of the vibrations shown in FIGS. 11(a) to 11(e) are opposite to those of the vibrations shown in FIGS. 12(a) to 12(e), respectively.

Figure 13:
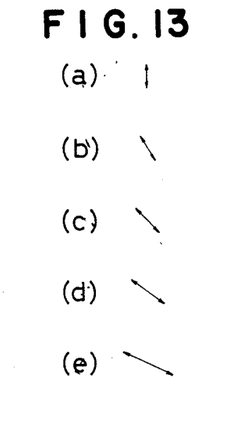
Figure 14:
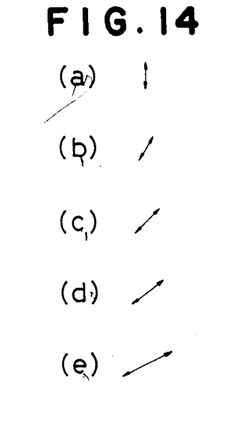
Figure 15:
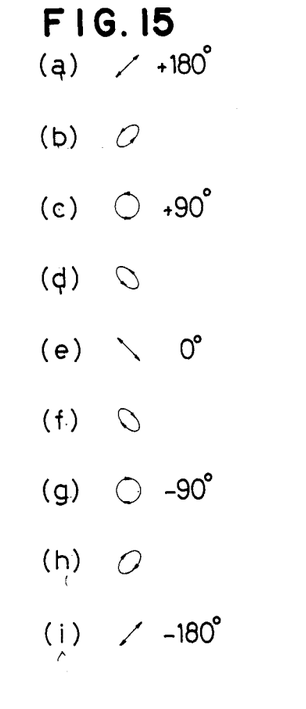

When a fixed driving voltage is applied to the electrode plate 25, a driving voltage of the same phase as that of the voltage applied to the electrode plate 25 is applied to the electrode plate, and the amplitude of the driving voltage applied to the electrode plate 23 is increased gradually from zero, the inclination of a torsional vibration shown in FIG. 13(a) varies gradually and the amplitude increases gradually as shown in FIG. 13(b) through 13(e). When the relative phase between the driving voltage applied to the electrode plate 23 and the driving voltage applied to the electrode plate 25 is inverted, the inclination of a torsional vibration shown in FIG. 14(a) varies gradually in the opposite direction and the amplitude of the torsional vibration increases gradually as shown in FIGS. 14(b) through 15(e) in a similar mode.

When driving voltages for generating an axial vibration and a torsional vibration of the same amplitude are applied to the electrode plates 23 and 25, and the relative phase between the driving voltages is zero, a diagonal linear vibration of an inclination of 45° with respect to the axis of the vibrator 10 as shown in FIG. 15(e) is generated. As the relative phase is increased in the positive direction from zero to +180°, the mode of vibration varies from that shown in FIG. 15(e) through those shown in FIGS. 15(d) through 15(a). On the contrary, when the relative phase is increased in the negative direction from zero to −180°, the mode of vibration varies from that shown in FIG. 15(e) through those shown in FIGS. 15(f) through 15(i), in which the directions of rotation of the vibrations are opposite to those of the corresponding vibrations shown in FIGS. 15(d) to 15(a), respectively.

Thus, composite vibrations various modes, such as linear vibrations, inclined linear vibrations, elliptic vibrations, inclined elliptic vibrations and circular vibrations, are produced by controlling the respective amplitudes and relative phases of the axial driving voltage and the torsional driving voltage. In addition, since the the torsional resonant frequency and the longitudinal resonant frequency are the same, the vibrator is easily controllable. Since the vibrator 10 does not require any additional members, the vibrator 10 can be formed in a compact construction without difficulty.

In the foregoing embodiment, the altered section 33 extends to the output end 34, however, the altered section may be modified in various forms for the same effect. Various modifications of the altered section 33 will be described with reference to FIGS. 16 to 22.

Figure 16:
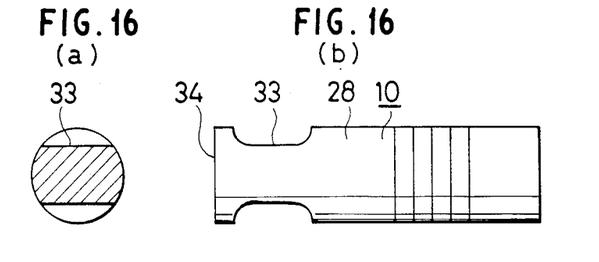

An altered section 33 shown in FIG. 16 extends between the body portion of a metallic member 28 and an output end 34, and has the same cross section as that of the body portion.

Figure 17:
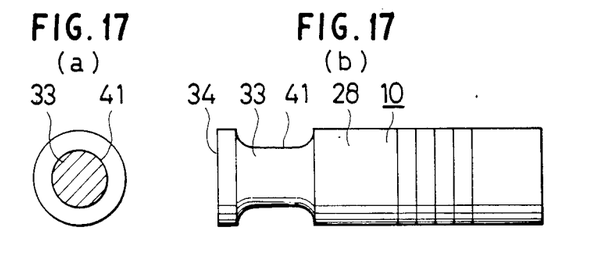

An altered section 33 shown in FIG. 17 extends between the body portion of a metallic member 28 and an output end 34, and has the shape of a round rod 41 having a round cross section of a diameter smaller than that of the body portion.

Figure 18:
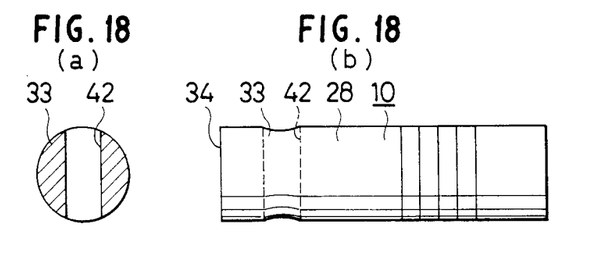

An altered section 33 shown in FIG. 18 extends between the body portion of a metallic member 28 and an output end 34, and has the same external form as those of the body portion and the output end 34, except that a round through hole 42 is formed through the altered section 33 perpendicularly across the center axis of the metallic member 28.

Figure 19:
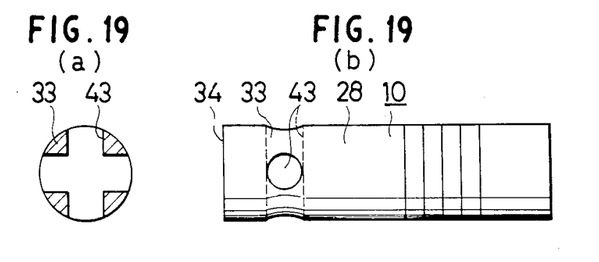

An altered section 33 shown in FIG. 19 extends between the body portion of a metallic member 28 and an output end 34, and has the same external form as those of the body portion and the output end 34, except that two round through holes 43 are formed through the altered section 33 perpendicularly across the center axis of the metallic member 28 and perpendicularly to each other.

Figure 20:
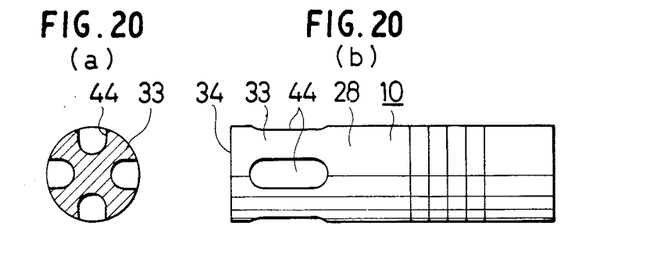

An altered section 33 shown in FIG. 20 extends between the body portion of a metallic member 28 and an output end 34, and has four axial grooves 44 formed in the circumference thereof.

Figure 21:
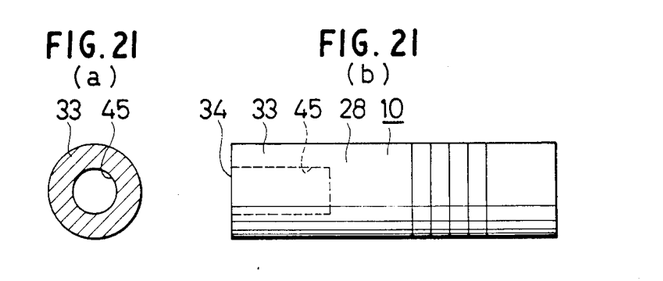

An altered section 33 shown in FIG. 21 extends from the body portion of a metallic member 28 to an output end 34, and has a round center hole 45 formed coaxially with the outer circumference thereof.

Figure 22:
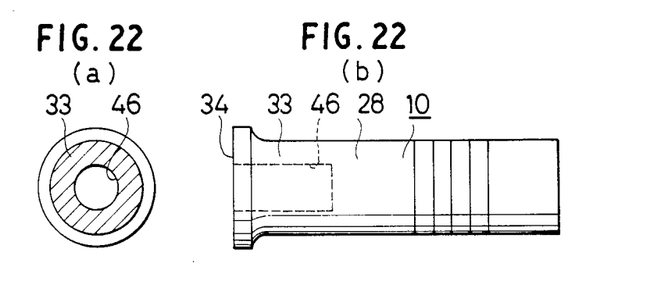

An altered section 33 shown in FIG. 22 extends between the body portion of a metallic member 28 and an output end 34 of a diameter greater than that of the body section, and has a round center hole 46 formed coaxially with the outer circumference thereof.

Figure 23:
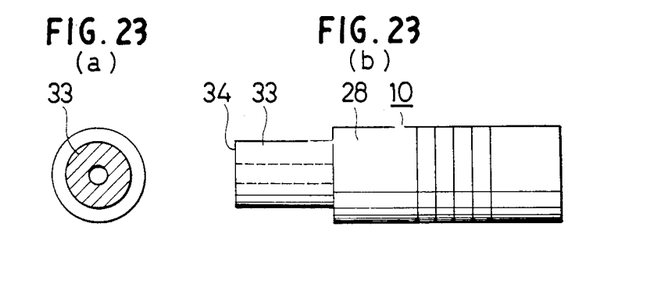

An altered section 33 shown in FIG. 23 extends from the body portion of a metallic member 28 to an output end 34, has a diameter smaller than that of the body portion and the same as that of the output end 34, and may be provided with a round center hole formed coaxially with the circumference thereof.

Such means increases the amplification of the amplitude of the torsional vibration and are suitable for application to ultrasonic motors which operate at a comparatively high rotating speed.

In the foregoing modifications, each output end 34 is round. A vibrator 10 capable of using the entire round surface of the output end 34 is advantageous, for example, in application to an ultrasonic motor. That is, the area of a surface in contact with the rotor is large, torque load per unit area is reduced and the contact surface is less abraded and thereby the durability and reliability of the ultrasonic motor is enhanced. To provide an increased contact area and increased torque capacity, a vibrator having an output end 34 having an increased area, such as shown in FIG. 22, is advantageous.

Figure 24A:
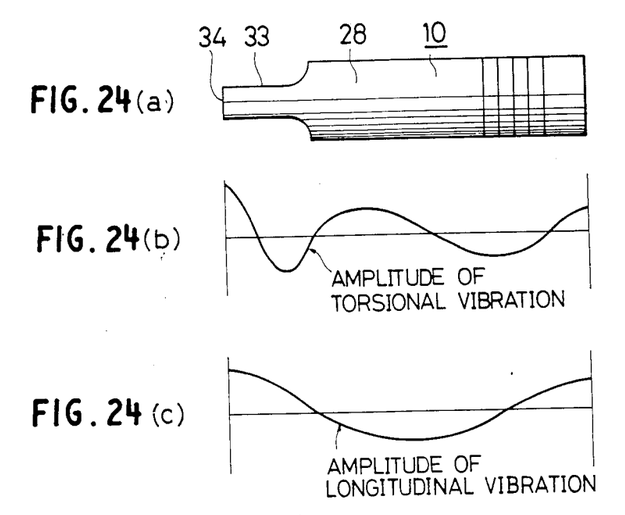
FIG. 24(a) is a side elevation of a ultrasonic vibrator of assistance in explaining a modified mode of vibration.

Although the first embodiment has been described as operated in a λ/2 longitudinal resonance mode and in a 1λ torsional resonance mode, the resonance modes are not limited thereto. For example, the vibrator can be satisfactorily operated in a 1λ longitudinal resonance mode and 2λ torsional resonance mode. Such an example is shown in FIGS. 24(a), 24(b) and 24(c). The vibrator 10 is in a 2λ torsional resonance mode as shown in FIG. 24(b) and in a 1λ axial resonance mode as shown in FIG. 24(c). The rounded shoulder of the altered section 33 of the vibrator 10 shown in FIG. 24(a) corresponds substantially to both the nodes of the torsional vibration and longitudinal vibration. Accordingly, the respective amplitudes of the torsional vibration and the longitudinal vibration at the output end are amplified and, since the respective nodes of the torsional vibration and the longitudinal vibration coincide with each other, the vibrator 10 has a significant advantage that the vibrator 10 can be held at a position corresponding to the nodes.

In the first embodiment, the metallic members and the electrostrictive transducers are fastened together with the bolt 32, however, in practical application, the metallic members and the electrostrictive transducers may be fastened together with a fastening nut or a fastening ring.

Further, the electrostrictive transducers are not limited to electrostrictive transducers 11 to 14; the number and disposition of the electrostrictive transducers are optional.

The driving system may be either a well-known constant-voltage driving system or a well-known constant-current driving system; desirably, the constant-voltage driving system and the constant-current driving system are applied to generating parallel resonance frequencies and series resonance frequencies, respectively.

Figure 25:
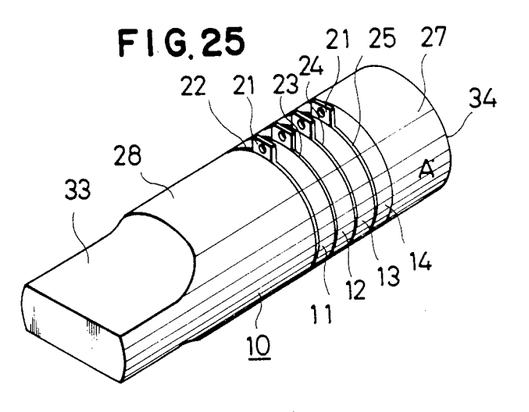
FIG. 25 is a perspective view of an ultrasonic vibrator, in a second embodiment, according to the present invention.

An ultrasonic vibrator, in a second embodiment, according to the present invention will be described with reference to FIG. 25, in which parts like or corresponding to those of the first embodiment are denoted by like reference numerals and the description thereof will be omitted. In the ultrasonic vibrator 10, in the second embodiment, the free end of a metallic member 27 is used as an output end 34 instead of the free end of the altered section 33 of a metallic member 28. Since the torsional resonant frequency and the longitudinal resonance frequency of the vibrator 10 coincides with each other, the vibrator is driven in the same manner as that for driving the vibrator of the first embodiment for the same mode of vibration of the output end 34. Since the altered section 33 is formed in the metallic member 28 not having the output end 34 to make the torsional resonant frequency and the longitudinal resonant frequency coincide with each other, the shape of the altered section 33 is not restricted by the shape of the output end 34. That is, the altered section 33 and the output end 34 may be formed individually in optional shapes, respectively. Accordingly, the shape of the altered section 33 may be such among shapes which will make the torsional resonant frequency and the longitudinal resonant frequency coincide with each other that can be most easily fabricated, while the output end 34 may be formed in a shape most appropriate to an equipment to which the vibrator 10 is applied. For example, when the vibrator 10 is applied to an ultrasonic motor, it is desirable to form the output end 34 in a shape which will provide a large surface to be brought into contact with a rotor. Thus, the second embodiment increases the degree of freedom of manufacture facilitating the manufacture of the vibrator 10.

What is claimed is:

1. An ultrasonic vibrator comprising:
   at least one torsional electrostrictive transducer for torsional vibration;
   at least one longitudinal electrostrictive transducer for longitudinal vibration having substantially the same shape and size as said at least one torsional transducer; and
   a pair of metallic members firmly, coaxially and integrally holding said at least one torsional electrostrictive transducer and said at least one longitudinal electrostrictive transducer therebetween; one of said metallic members having an altered section formed in such a shape whereby the torsional resonant frequency and the longitudinal resonant frequency of said vibrator coincide with each other.

2. An ultrasonic vibrator as recited in claim 1, wherein an output end is provided only in the metallic member having said altered section.

3. An ultrasonic vibrator as recited in claim 2, wherein the cross section of said metallic member having said altered section is changed at a position corresponding to the node to form said altered section.

4. An ultrasonic vibrator as recited in claim 1, wherein said altered section is formed only in said metallic member not having said output end.

5. An ultrasonic vibrator as recited in claim 1, wherein the mode of torsional resonant vibration is a $1\lambda$ resonance mode and the mode of longitudinal resonant vibration is $\lambda/2$ resonance mode.

6. An ultrasonic vibrator as recited in claim 1, wherein the mode of torsional resonant vibration is 2 resonance mode and the mode of longitudinal resonant vibration is $1\lambda$ resonance mode.

7. An ultrasonic vibrator as recited in claim 1, wherein the outside diameter of said output end of the metallic member is greater that the outside diameter of the rest portion of the metallic member.

* * * * *